June 13, 1967     G. O. WALTER ETAL     3,324,762
MARKING METHOD AND APPARATUS
Filed Aug. 2, 1965     6 Sheets-Sheet 1
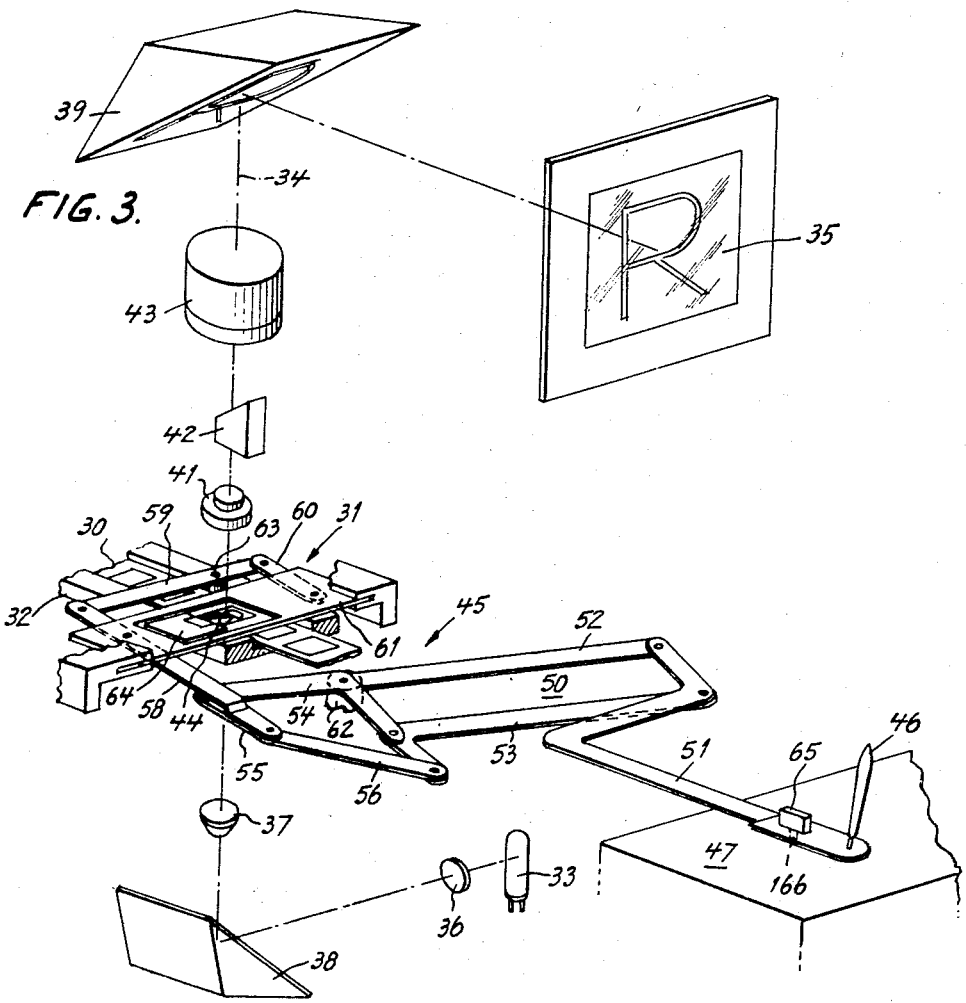
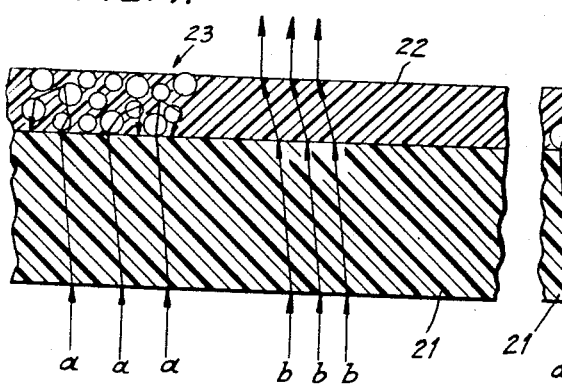
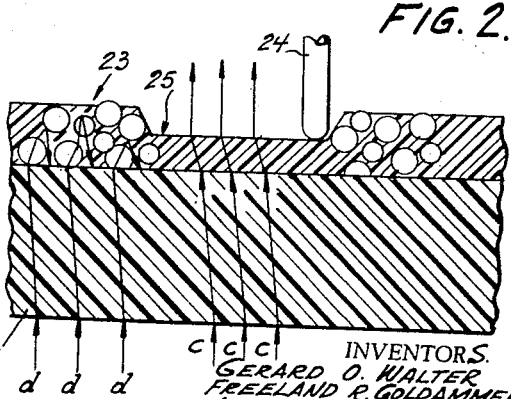
INVENTORS.
GERARD O. WALTER
FREELAND R. GOLDAMMER
ATTILIO A. DEMEO
FRED M. PINTUS
BY C. M. Miranda
ATTORNEY

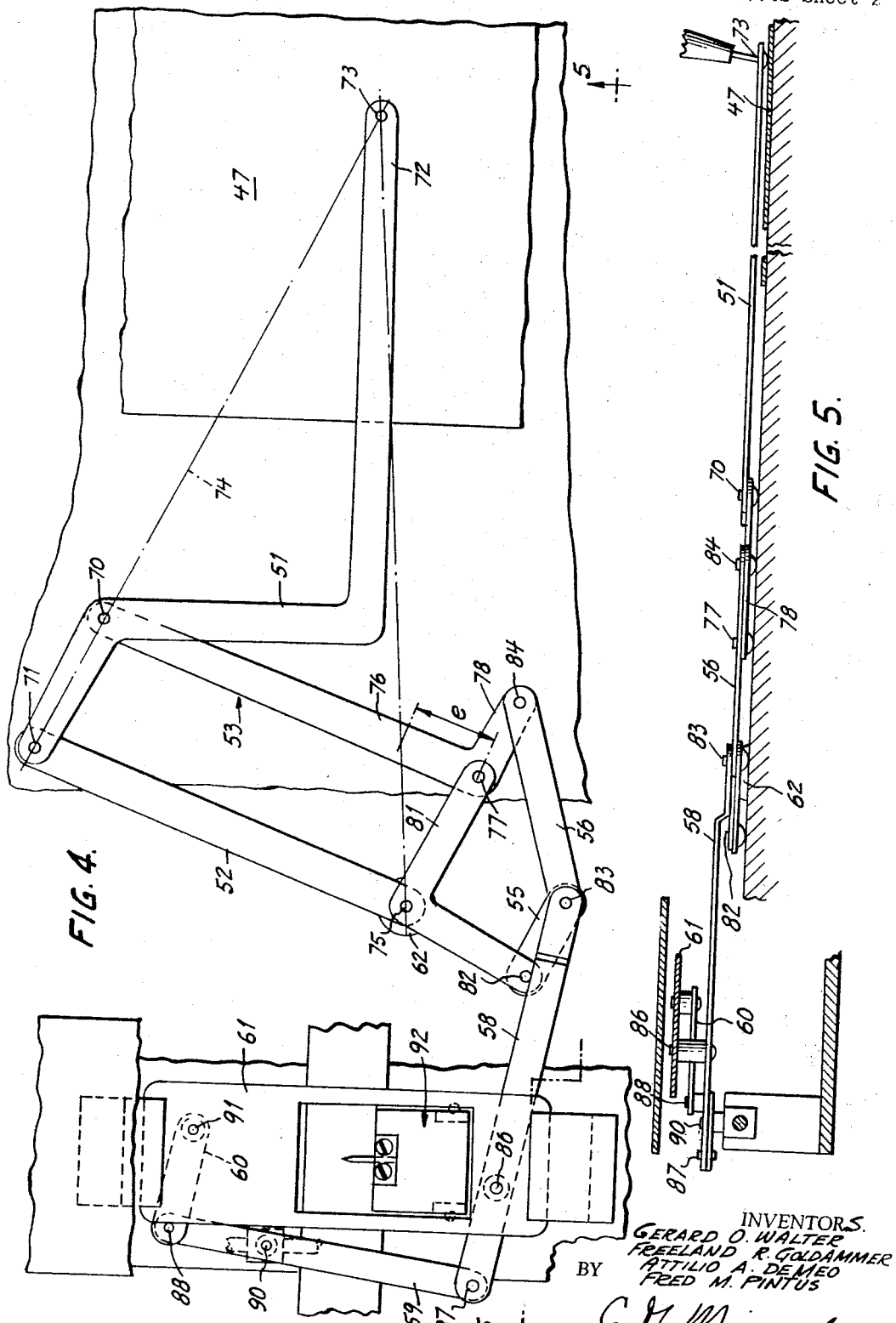

June 13, 1967  G. O. WALTER ET AL  3,324,762
MARKING METHOD AND APPARATUS
Filed Aug. 2, 1965  6 Sheets-Sheet 3

INVENTORS.
GERARD O. WALTER
FREELAND R. GOLDAMMER
ATTILIO A. DE MEO
FRED M. PINTUS
BY
C. M. Miranda
ATTORNEY June 13, 1967  G. O. WALTER ETAL  3,324,762
MARKING METHOD AND APPARATUS
Filed Aug. 2, 1965
6 Sheets-Sheet 4
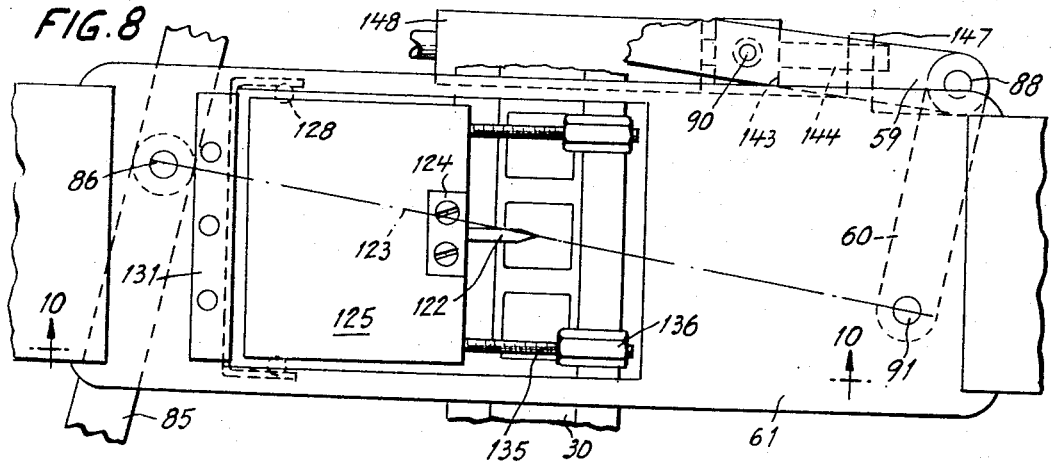
FIG. 8
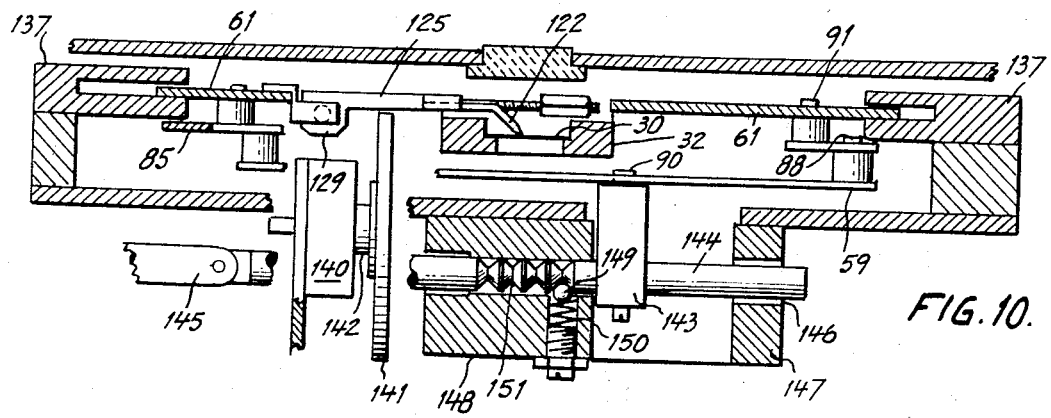
FIG. 10.
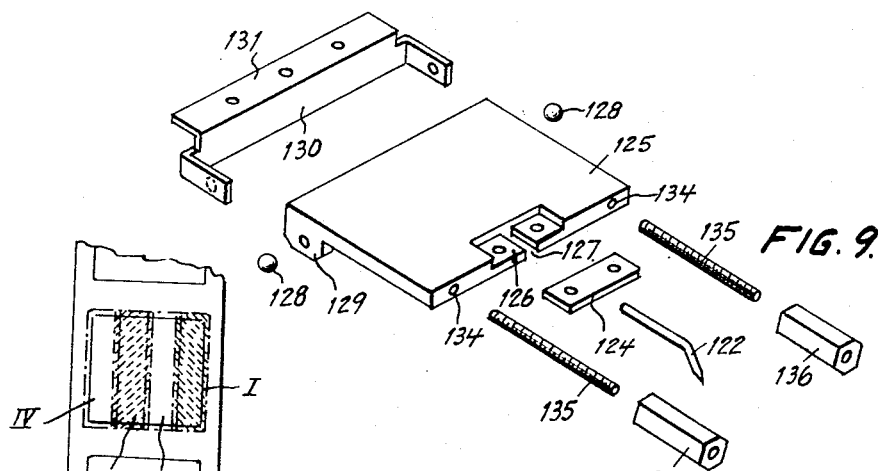
FIG. 9.
FIG. 10A.
INVENTORS.
GERARD O. WALTER
FREELAND R. GOLDAMMER
ATTILIO A. DEMEO
FRED M. PINTUS
BY
C. M. Miranda
ATTORNEY

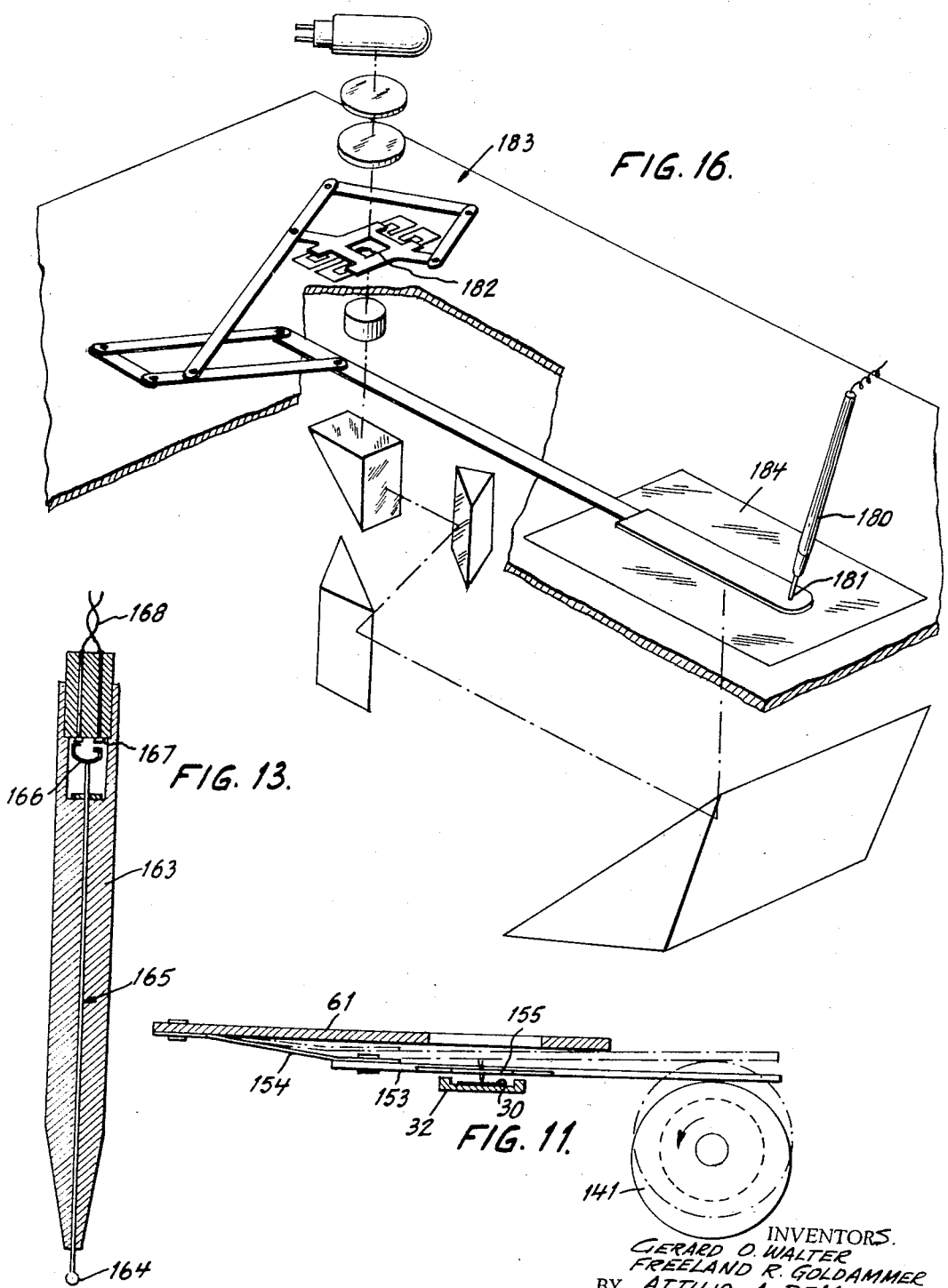

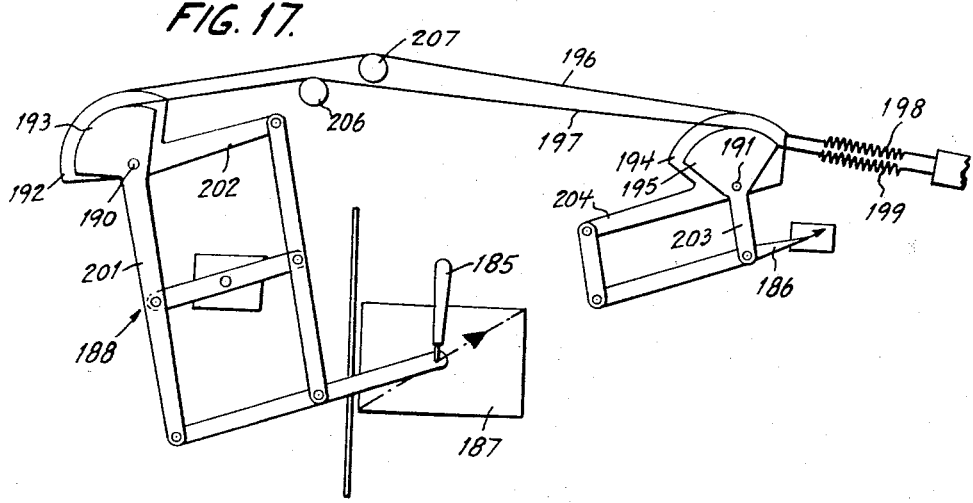
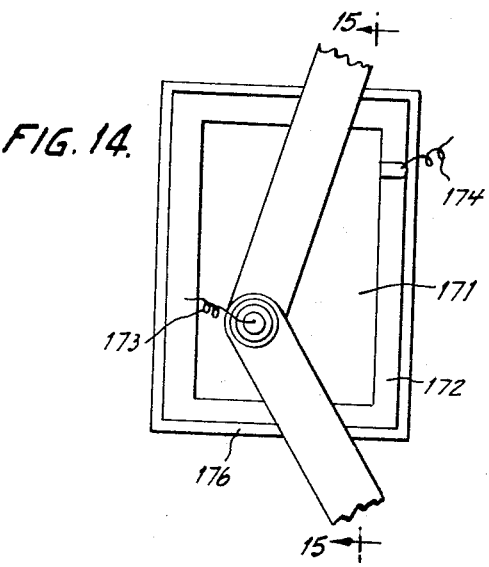
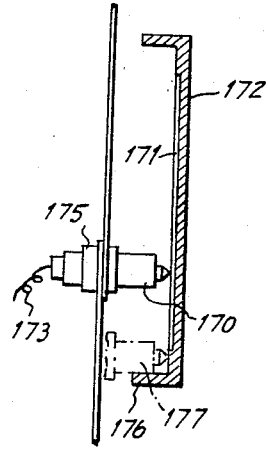
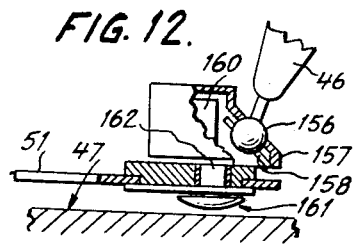

United States Patent Office 3,324,762
Patented June 13, 1967

3,324,762
MARKING METHOD AND APPARATUS
Gerard O. Walter, Westbury, Freeland R. Goldammer, Williamsville, Attilio A. De Meo, Brooklyn, and Fred M. Pintus, White Plains, N.Y., assignors to Sperry Rand Corporation, New York, N.Y., a corporation of Delaware
Filed Aug. 2, 1965, Ser. No. 476,593
12 Claims. (Cl. 88—24)

ABSTRACT OF THE DISCLOSURE

Marking apparatus employed in microfilm viewing equipment. Accurate marking of a particular area of an image bearing medium during the viewing thereof is facilitated by the use of an externally located pen mounted for manipulation by an operator to remotely control a marking stylus located adjacent the mentioned particular area. A pressure sensitive type film is utilized as the image bearing media. The film comprises a light transparent material having a coating thereon including microscopic vesicules disposed to form predetermined light obstructing images. To mark the filmed image, pressure is applied to the coating to selectively collapse the vesicules.

---

The present invention relates to the art of marking and more particularly to apparatus for and method of accurately marking image-bearing media, such as microfilm.

With the advent of microfilm becoming a working tool in business, industry and science, rather than a mere archival storage means for the documentation of past events, a need arises for means to update, add-to, or delete the information recorded on microfilm. For example, when the recorded information is miniature copies of documents such as bookkeeping records, letters, schedules of transportation departures and arrivals, motor vehicle operator permits, chemical formulae and processes, subscriber information lists, or any other archival-type documents, it often becomes necessary to change the documented information. One presently known-to-the-art procedure of making such changes is to change the original document, from which the microfilmed image has been derived, and to then remicrofilm the changed original document and replace the original microfilmed image with the changed version. In many instances the individual image forms part of a continuous roll or strip of microfilm containing many other images and to effect a change it becomes necessary to either splice in the new image, which is a costly procedure and requires special skills and ancillary equipment, or to rephotograph the new image in sequence with all the unchanged neighboring images to create a new roll, which is obviously an economically undesirable solution, especially in view of the fact that there are usually several thousand images contained on a signal roll. In other instances the individual images are severed from the strip in chip form and mounted on a card bearing identifying indicia, in which case it is also economically undesirable and time consuming to require rephotographing of changed documents, and in some such cases the chips are permanently retained on the mounting card making it necessary to prepare a new card when the chip image requires change.

Further, it is a principle purpose of many microfilming systems to conserve space by converting documents to microfilm and to then destroy the original document, which purpose of course cannot be realized if it is necessary to save the documents for future updating. When, in such instances, the documents are of a nature where updating is common (such as transportation arrival and departure schedules) and by retaining the original document the purpose of microfilming is defeated, then writing on the microfilm obviates the necessity of making up a new document for remicrofilming whenever a change is required.

The general problem of accurately marking a particular area of any type document or image-bearing medium has been encountered in the past, especially when the media is of such diminutive size that marking becomes ineffective through ordinary visual methods and apparatus. A common difficulty encountered is the requirement of initially establishing and then accurately maintaining the area over which the marking instrument engages the medium. In the case of microfilm the tolerance required might well be in the range of about one thousandth of an inch. Problems have also been encountered in establishing finely resolved coordination between the marking instrument, which is generally quite delicate, and the implementing force which can be an operator or an automatically controlled input device. Further, problems have been encountered in the selection of a microfilm material having properties which exhibit characteristics of a nature favorable to effective marking. For example, although an ink mark might suffice in some instances of updating microfilm, if an inscribed mark is desired for permanence, ordinary microfilm, consisting of an acetate or other plastic base with a modified gelatine emulsion, which has been hardened during the processing of the film, does not lend itself to the inscription of a distinct mark due to the inherent brittleness of the emulsion.

It is, therefore, an object of this invention to provide novel marking apparatus.

Another object is to provide a novel marking method.

Still another object is to provide apparatus for and a method of accurately marking predetermined areas of photographically reproduced images.

Yet another object is to provide apparatus for and a method of updating, adding to, altering or deleting a certain portion of a photographic record of documented matter while the record is being viewed by the operator of a film reading device.

A further object is to provide apparatus for and a method of marking microfilm of the type having a transparent base coated with a vesicular expanded plastic, while the microfilm image is being illuminated and mangified in the read area of a microfilm reading device.

A still further object is to provide apparatus for and a method of marking an image bearing medium by applying pressure to the surface of said medium without leaving a residue.

Yet a further object is to provide apparatus for and a method of marking microfilm, of the type having a transparent base coated with a plastic having light scattering vesicules dispersed in a pattern therein, by compressing the coating in accurately determined areas to a homogeneous transparent state.

The present invention is directed to a method of and apparatus for accurately positioning a microfilm marking instrument adjacent the surface of a particular microfilmed document disposed in the marking of viewing station of apparatus as for example, a microfilm reader, and the invention introduces the novel use of a pressure sensitive film for the purpose of making marks by applying pressure to the surface thereof. According to a preferred embodiment, the invention contemplates apparatus which is readily employed with microfilm equipment for projecting a microfilmed document on a viewer, and which apparatus is operable by an operator externally of the equipment for marking on the microfilmed document guided by and in accordance with, the image projected on the viewer. The apparatus includes a pantographic linkage assembly, hving two pantographs serially connected such that the output of one pantograph is connected to the input of the other pantograph, an input pen mounted on the input arm of the first pantograph, and a marking stylus mounted at a takeoff point of the second pantograph, whereby operator manipulation of the input pen is mechanically transmitted at a reduced ratio to the remotely mounted marking stylus. It is to be understood that the term "stylus" is used throughout in a generic sense and is not intended to limit that to which it is associated to only instruments with pressure applying tips (as in the preferred embodiment), but rather it is intended that the term "stylus" encompass all types of marking instruments. The stylus assembly of the preferred embodiment includes a marking instrument mounted in the proximity of the microfilm reader projection aperture such that the marking tip selectively engages the surface of the film and moves thereacross along a path determined by manipulation of the input pen, while the image carried by the microfilm frame in the aperture and the image of the stylus tip are both projected on the viewer screen. Thus, the pattern of the marking on the film may be determined and viewed with relation to the image on the microfilm by virtue of the superimposed image of the stylus.

Adaptation of subject apparatus for use with conventional microfilm reader equipment is facilitated by the novel arrangement of pantographic linkages which may be selected to yield any desired reduction ratio and any desired shift of the scribing motion direction with respect to input motion. For example, if in one particular reader it is desired to scribe at a 20 to 1 ratio, i.e., the ordinary motion of the input pen manipulated by the operator is reduced by a factor of twenty when it is transferred to a particular size microfilm, the pantographic system elements are adapted to accommodate such a requirement. If, on the other hand, in a different reader, handling a different size film, the ratio required is 18 to 1, then to incorporate subject apparatus therein it merely becomes necessary to select pantographic system elements with different physical dimensions, whereby ordinary motion of the input pen manipulated by the operator is reduced by a factor of eighteen when it is transferred to the microfilm. Further, when subject apparatus is incorporated in a system in which the film is automatically brought to the projection aperture for scribing and viewing, the direction of travel of the film with respect to the aperture disposition within the machine and the position of the input pen without the machine, vary from machine to machine, i.e., in one instance the microfilm frame in the aperture might be rotated 90° with respect to the orientation of the surface over which the input pen is manipulated, while in another instance the frame might be arranged in a mirror reversed manner in the aperture with respect to the input pen motion. Regardless of the relative disposition, it is desirable and necessary to manipulate the input pen in an ordinary writing motion to make markings on the film that are disposed in a proper relationship with respect to the documented matter on the film, and the viewed image. The subject apparatus provides a novel linkage arrangement, associated with the first pantograph, for effecting desired rotation of the output stylus motion relative to input manipulation. Also, by relative selection of pivot mounting of the second stage pantograph with respect to pivot mounting of the first stage, mirror reversed output motion may be obtained.

The foregoing and other objects, features, and advantages of the invention will appear more fully hereinafter from a consideration of the detailed description which follows, considered in conjunction with the accompanying drawings wherein several embodiments of the invention are illustrated by way of example. It is to be expressly understood, however, that the drawing is for illustrative purposes only and is not to be construed as defining the limits of the invention.

In the drawings, wherein like reference characters refer to like parts through out the several views:

FIG. 1 is a diagrammatic cross sectional view of an image carrying medium in its basic form, as used in the present invention;

FIG. 2 is a diagrammatic cross sectional view of an image carrying medium and an associated pressure applying stylus;

FIG. 3 is a diagrammatic illustration in perspective of the marking apparatus of the present invention and its relationship with conventional microfilm reader elements;

FIG. 4 is a plan view of the preferred embodiment of the marking apparatus;

FIG. 5 is a side elevation view of the marking apparatus shown in FIG. 4;

FIG. 8 is an enlarged plan view showing the stylus mounting arrangement employed in the preferred embodiment of the novel marking apparatus shown in FIG. 4;

FIG. 9 is an exploded perspective view of a portion of the stylus mounting arrangement;

FIG. 10 is a side elevation view of the marking-reading station taken along line 10—10 of FIG. 8, and shows the stylus mounting arrangement in relation to the output pivot detent mechanism and the stylus life mechanism of the preferred embodiment;

FIG. 10A is an enlarged plan view of a section of microfilm with predetermined scribing sectors outlined for illustration;

FIG. 11 is a diagrammatic illustration of another embodiment of the stylus mounting assembly and shows a lift mechanism therefor in solid and phantom views corresponding to the limits of displacement during operation;

FIG. 12 is a side elevation view with a partial cutaway area of the preferred input arm switch and pen mounting arrangement;

FIG. 13 is a diametric section view of another embodiment of the input arm switch;

FIGS. 14 and 15 are schematic illustrations in plan and elevation respectively, of a limit safety feature of subject apparatus, with FIG. 15 taken along line 15—15 of FIG. 14;

FIG. 16 is a perspective view illustrating a further embodiment of subject marking apparatus; and FIG. 17 is a further embodiment of the linkage system employed in subject marking apparatus.

Figure 7:
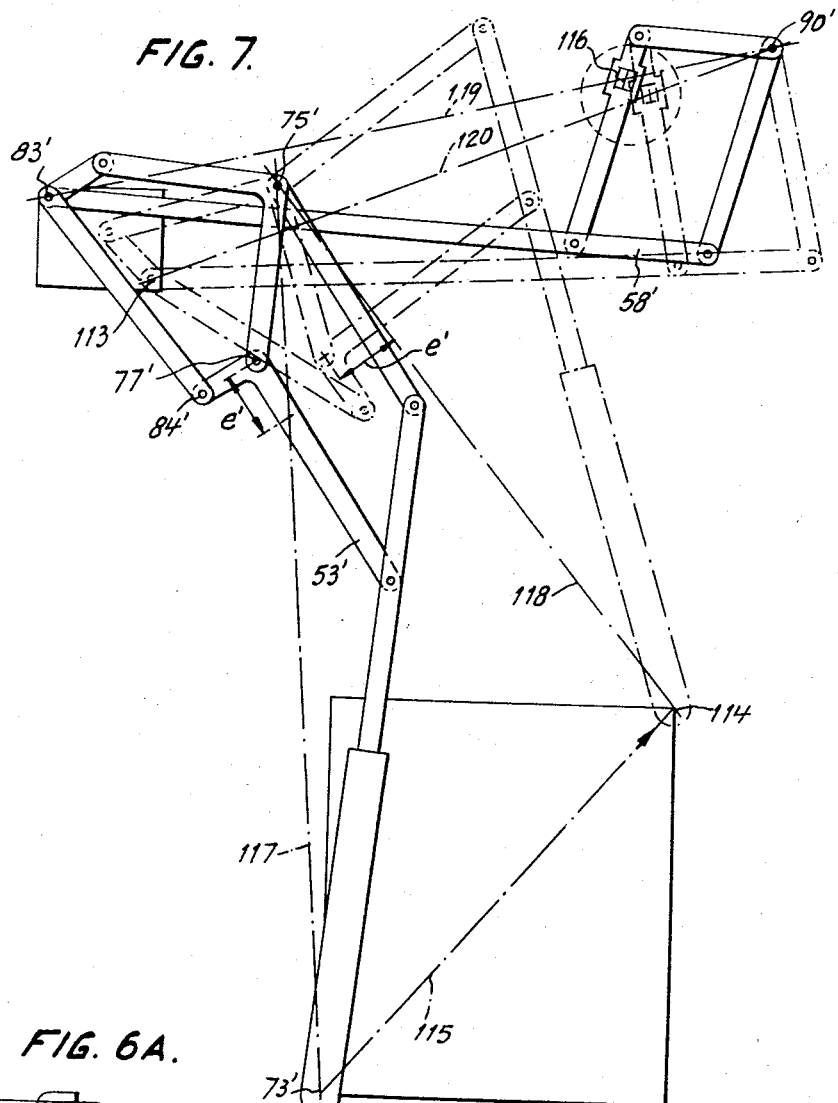
FIG. 7 is a simplified plan view of a modified linkage system including a phantom view of the linkage system in a displaced position.

Referring now to the drawings for a more detailed description of the invention, FIG. 1 shows a diagrammatic cross sectional view of an image carrying medium used in a novel manner in carrying out the present invention. The medium comprises a transparent thermo resistive base 21 and a thermo plastic coating 22, having expanded microscopic vesicules dispersed therein. An example of a commercially available material in this class is Kalvar, which consists of a base material of the polyacrylate resin type such as Mylar and a polyester coating of Saran in which an organic diazo salt compound is decomposed. It is common to utilize such material as microfilm in which case the material is known under the name of Kalfax. A description of Kalfax is contained in an article entitled "The Miraculous Bubble: A Look at Kalfax Microfilm," appearing at pages 40 through 46 of Library Resources and Technical Services, volume 3, No. 1, Winter, 1959.

In the processing of Kalfax microfilm, which is completely transparent in its basic form, a certain portion of the coating is exposed whereby the decomposition product expands to form microscopic vesicules designated generally by the reference numeral 23 in FIG. 1. Thus, in the processed state Kalfax presents an image defined by areas containing expanded vesicules distinguished from areas void of expanded vesicules, whereby light incident on Kalfax is scattered by the vesicules to present a light image when viewed directly or, alternatively, a light background depending on whether a negative or positive exposure is employed in the process. When the film is used in a microfilm reader the vesicules (due to their light scattering propensity) cast a shadow on the projection screen which shadow is of course black, and thus it can be said that a positive image is obtained from the positive film. To further illustrate this principle, light rays $aaa$ incident on the coating 22 of the medium shown in FIG. 1 are shown scattered by vesicules 23, whereas those light rays $bbb$ incident on the coating at an area void of expanded vesicules are refracted but emerge parallel to each other.

Referring now to FIG. 2, a similar diagrammatic cross sectional view of an image carrying medium such as Kalfax is shown to which pressure has been applied through marking member 24, which comprises an element for locally applying pressure to the processed Kalfax film to collapse the expanded coating and reinstate the Kalfax to its transparent state in the area over which the tip of marking member 24 has traversed. In effect, the expanded coating 23 has been locally depressed and an indentation 25 results, through which a collimated bundle of light $ccc$ readily passes and emerges in a substantially parallel condition, as opposed to a similar bundle of light $ddd$ which is scattered when incident on a portion of the coating having expanded vesicules disposed therein which have not been depressed. Even though an indentation or groove results, it is readily apparent that no actual material has been removed from the coating. The mark that results from the depression appears on a microfilm projection screen as a light mark distinguished on a dark background, similar to the actual image itself which is defined by a pattern of light passing areas distinguished from light scattering areas, i.e., shaded areas as discussed above.

It is to be understood that the pressure sensitive material discussed above is merely exemplary of the type of material contemplated and it is not intended that the present invention be limited to use only with that particular material; however, the use of that particular material or any similar type material is a novel and unique feature of this invention. It is to be further understood that FIGS. 1 and 2 are presented for illustrative purposes and are not intended to be accurate cross sections inasmuch as relative dimensions are concerned.

It is not uncommon in the microfilm industry to mount microfilm strips or chips in containing means such as a card or an envelope whereby the microfilm (referred to hereinafter as film) is readily accessible for optical display without removal from the containing means. Examples of such mounting arrangements include, indicia bearing cards having transparent pockets adapted to receive film chips, transparent envelopes adapted to receive film strips, and mounting means adapted to receive a plurality of film chips and/or strips in a prearranged manner in which the mounting means is transparent at least in the areas adjacent the film. In all such mounting arrangements a thin transparent overlay is disposed adjacent the film surface through which localized pressure may be transmitted, therefore, such mounting arrangements are intended to be within the general realm of mounting arrangements for pressure sensitive type film, to which the present invention is specifically related.

FIG. 3 is a schematic presentation of apparatus in which a marking instrument is accurately positioned and manipulated to mark an image bearing medium. The apparatus is conveniently adapted to mark pressure sensitive microfilm such as Kalfax but is not limited to use with film of that type. In FIG. 3, film 30 is conveyed through a marking-viewing station, generally designated by reference numeral 31. The film is supported in a conventional manner, e.g., by channel shaped member 32 mounted such that the portion of the film in the marking-viewing station is firmly supported over an aperture therein through which light is projected. Hereinafter, reference to the film, and its disposition in the mark-viewing station, presupposes that conventional support means are utilized to maintain the film along a plane perpendicular to the projection axis of a typical optical projection system without impeding light rays of such system. Projection lamp 33 projects light rays which travel along projection axis 34 and terminate at viewing screen 35 to display an image of the documented information present on the particular frame of film disposed in the projection path. The optical system includes the projection lamp 33, condensing lens 36 and 37, reflecting mirrors 38 and 39, collimating lens 41, prism 42, decollimating lens 43, and the viewing screen 35, all of which are conventional elements employed in a well known manner to project an image on a viewing screen. Also disposed at the marking-viewing station 31 is a marking stylus 44 adapted to make marks on the film disposed in the optical projection path. The marking stylus 44 extends in the aperture from a hingedly mounted plate (not shown in FIG. 3) for engagement with the surface of the film at the marking-viewing station, in a manner whereby only the shaft and tip of the marking instrument shade light rays projected along axis 34.

A pantographic linkage system 45 interconnects the stylus 44 and an input pen 46 which is disposed adjacent to a work surface 47 externally of the apparatus with respect to the optical system, which optical system is enclosed in a microfilm reader cabinet having a framework to which the various elements are mounted, among which is the viewing screen 35 which displays an image in an area visually accessible to the operator who manipulates pen 46. The pantographic linkage system 45 generally comprises input pantograph 50, having an input arm 51, a first pivotally engaging member 52, a second pivotally engaging member 53, a third pivotally engaging member 54, a fourth pivotally engaging member 55, and a fifth pivotally engaging member 56, and an output pantograph 57 having an input arm 58, a first pivotally engaging member 59, a second pivotally engaging member 60, and a third pivotally engaging member 61. The input and output pantographic have fixed pivots mounted at mounting locations 62 and 63, respectively. The third pivotally engaging member 61 of the second pantograph serves as a mounting means for the hingedly mounted stylus mounting plate assembly 64 from which the marking instrument extends, whereby the tip is disposed at a particular takeoff point for the second pantograph. A switch 65 is mounted on input arm 51 for engagement with work surface 47, and which input arm 51 is flexibly mounted parallel and in close proximity to the work surface in a manner permitting an actuator arm 66 to be urged gently against work surface 47 when pen 46 is manipulated by an operator.

The pantographic linkage system is shown in more detail in FIGS. 4 and 5 where input arm 51 of input pantograph 50 (see FIG. 3) comprises a straight portion extending between pivots 70 and 71, and an integral L-shaped portion extending from pivot 70 with free end 72 adapted for mounting at point 73 thereon an input implement, such as an input pen 46 as shown in FIG. 3 and as partially shown in FIG. 5. The point at which the input pen is mounted to input arm 51 is determined by a straight line 74 which goes through and is in the plane of pivots 70 and 71. The input pantograph further includes; first pivotally engaging member 52, extending between pivot 71 and fixed pivot 75; second pivotally engaging member 53 comprising a bell crank having an arm 76 extending between pivots 70 and 77, which arm is equal in length to the first pivotally engaging member 52, and a second arm 78 the length of which is equal to distance $e$ determined by the intersection of arm 76 and a line 80 through fixed pivot 75 and point 73; third pivotally engaging member 54, comprising an equi-arm bell crank having a first arm 81 extending between fixed pivot 75 and pivot 77; fourth pivotally engaging member 55, extending from pivot 82 at the extremity of the second arm of the third pivotally engaging member 54, and equal in length to arm 78 of second pivotally engaging member 53; and a fifth pivotally engaging member 56 extending between pivots 83 and 84 and having a length determined by the fixed distance between pivots 82 and 77 at the extremities of the arms of the equi-arm bell crank comprising third pivotally engaging member 54.

The output pantograph 57 (see FIG. 3) includes input arm 58 extending from the output takeoff point of the first pantograph at pivot 83. Input arm 58 pivotally engages pivots 86 and 87. The output pantograph further includes; first pivotally engaging member 59 extending between pivots 87 and 88 and engaging, intermediate thereof, fixed pivot 90, the fixed position of which is adjustable as described in detail hereinafter; second pivotally engaging member 60 extending between pivots 88 and 91, and having a length equal to the distance between pivots 86 and 87 engaged by input arm 58; and third pivotally engaging member 61, extending between pivots 86 and 91, serving as a mounting means for hingedly mounted stylus mounting plate assembly 92.

Figure 6A:
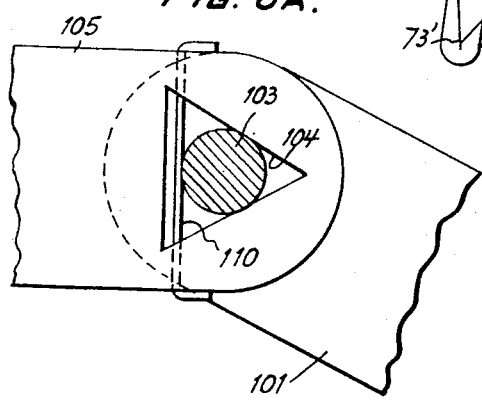
FIGS. 6 and 6A are detailed views of the pivot arrangement employed in the first stage of the pantographic linkage system of subject marking apparatus, with the FIG. 6A view taken along line 6A—6A of FIG. 6.
Figure 6:
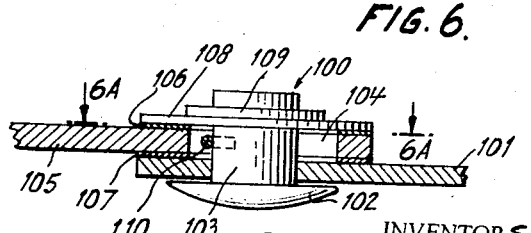

FIGS. 6 and 6A illustrate in detail the pivot arrangement employed at pivots 70, 71, 77, 82 and 84 of the input pantograph to control backlash and maintain accurately dimension specifications which is a commonly known requisite of any precision pantograph. A pivot pin 100 is secured to the typical lower pivotally engaging member 101 with a contact surface 102 protruding therefrom and a shank portion 103 extending upwardly to register with a triangular aperture 104 in the typical upper pivotally engaging member 105. Disposed coaxially with respect to pivot pin 100, are Teflon washers 106 and 107 mounted as shown in the partial section view of FIG. 6 for sliding engagement with the pivotally engaging members, metal washer 108, and retaining ring 109. As shown in the FIG. 6A view taken along the line 6A—6A of FIG. 6, pivot pin 100 is biased toward two sides of triangular aperture 104 by a spring loading wire 110 which is mounted in transverse holes in the upper pivotally engaging member and extends through the triangular aperture 104 for engagement with the surface of the shank portion of pivot pin 100. The same type arrangement is utilized for fixed pivot 75 wherein the pivot pin shank is fixed and extends from pivot mounting base 62, (see FIGS. 3–5), and for pivot 83, wherein both the two upper pivotally engaging members are provided with triangular apertures and biasing means.

The actual physical displacement of the linkage system employed in subject apparatus is illustrated in FIG. 7, wherein a schematic diagram shows a two-stage pantograph system in a first position (solid lines) and in a second position (phantom lines). FIG. 7 further illustrates the operative effect of the relative position of the fixed pivot of the output pantograph with respect to the input arm thereof. Primed reference numerals are used to designate the elements of the linkage system shown in FIG. 7, which numerals correspond to like parts of the system shown in FIG. 4. In FIG. 7, the input pantograph has substantially the same configuration as the input pantograph of FIG. 4 and pivots about stationary pivot 75'; however, the output pantograph pivots about fixed pivot 90', which is disposed on the side of input arm 58' opposite to that of fixed pivot 90 of the FIG. 4 system. Although the general principle of pantographic operation remains the same, selection of the alternative disposition of the fixed output pivot permits either mirror-reversal of the image traced at the output takeoff pivot or non-mirro-reversal of the traced image, i.e., in FIG. 4, the image traced is mirror reversed, whereas in FIG. 7 the image traced is not mirror reversed.

Referring now to FIG. 7, pivot 83', which is the output takeoff point of the first pantograph, is shown in solid lines in its position corresponding to input point 73' in solid lines. The phantom lines show the pivot in new position 113 corresponding to the new position 114 of the input point after an excursion along line 115 by input point 73'. By virtue of the novel linkage system the output takeoff point at pivot 83' traverses along a line between 83' and 113, which is rotated 90° with respect to the direction of travel of input point along line 115. The distance over which pivot 83' travels with respect to input point 73' is determined by the selection of the conventional pantographic dimensions. This distance for the purposes of subject apparatus is necessarily reduced with respect to the excursion of the input point. Further, the output pantograph input point is connected to the output takeoff point of the input pantograph, thus, the above-mentioned reduction in linear displacement can be transferred to the output point of the output pantograph whereat a total displacement is realized which also includes the reduction resulting from the output pantograph. Therefore, the output takeoff point 116 (FIG. 7) moves in accordance with input point 73 as far as the pattern of displacement is concerned, but the pattern traced is rotated 90° clockwise and is reduced in size an amount dependent on the effect of the series connected pantographs. The pattern traced will be an undistorted replica of the path of travel of the input point 73'. To this end, a straight line 117 extending between fixed pivot 75' and input point 73' will intersect pivotally engaging member 53' a distance $e'$ from pivot 77' regardless of the position of the system elements, e.g., see line 118 for the phantom position. (Distance $e'$, as noted above, is equal to the distance between pivot 77' and pivot 84'.) Likewise, a straight line extending between the input point of the output pantograph and the fixed pivot of the output pantograph will always pass through the output takeoff point as illustrated by lines 119 and 120.

The pantographic system as described above is adapted for mounting a stylus at its output takeoff point which moves in accordance with a pattern determined by manipulation of a pen having a tip at the input point, for the purpose of remotely marking miniature documents positioned in the proximity of the stylus and for engagement therewith. FIGS. 8 and 9 show one embodiment of the mounting arrangement for the stylus at such takeoff point. In FIG. 8, pivotally engaging members 85, 59, 60 and 61 are shown supported by fixed pivot 90 in the manner discussed above. Member 61 is provided with a rectangular aperture in which stylus 122 is hingedly mounted for engagement with film 30, whereby motion of such member causes the tip of stylus 122 to move relative to the film. The stylus tip is aligned at the takeoff point of the pantographic system and to this end is disposed along a line 123 extending between pivots 86 and 91. The stylus shank is soldered to holding plate 124 (see FIG. 9) which is secured to mounting plate 125 at recessed portion 126 which is provided with a slot 127 to receive the soldered shank portion of the stylus. Spherical bearing members 128 are urged against a receiving recess in ears 129, by a spring yoke member 130 having similar bearing receiving recesses. The spring yoke member has an integral flange 131 adapted to be secured in a conventional manner to member 61. The stylus mounting plate 125 is further provided with stud receiving holes 134 having threaded studs 135 extending therefrom with ballast members 136 adjustably disposed thereon, to effectively vary the pressure applied through the stylus tip of the surface of the film, by varying the moment present with respect to an axis through the centers of spherical bearing members 128.

In one embodiment of the subject apparatus, a stylue constructed in accordance with the following specification was found satisfactory: stylus tip material-clear synthetic sapphire; stylus diameter —.012±.0005 inch; stylus cone angle —40° to 60° included angle; stylus tip spherical radius —.0007±.0001 (standard 0.7 mil); stylus scribing angle —40° to 50°; stylus length as required by stylus shank receiving slot 127; and stylus tip projection —.015 inch maximum below bottom surface of main stylus shank portion.

FIG. 10 is a cross sectional view taken along line 10—10 of FIG. 8 and shows a cutaway of the mounting means for the detent mechanism employed in the adjustment of fixed pivot 90 (see FIG. 8). As discussed above with respect to FIGS. 8 and 9 stylus 122 is hingedly mounted for engagement with microfilm 30, which engaged position is shown in FIG. 10. A stylus lift assembly provides a stylus work position (FIG. 10) in which the stylus tip engages the surface of the microfilm, and a stylus lift position in which the stylus assembly is rotated away from the microfilm. As mentioned hereinafter, the output pantograph is primarily supported by fixed pivot 90. Member 61 of the output pantograph is further supported by slotted blocks 137 as shown in FIGS. 8 and 10 to aid in accurately maintaining the relationship between the stylus and film when the stylus is in both the work and the lift positions. The stylus lift assembly comprises a rotary solenoid 140, and a cam 141 operatively associated therewith. Solenoid 140 is a rotary solenoid having two discrete angular shaft positions and is operative to one position in response to its energized condition, and is operative to its other position in response to its non-energized condition. When solenoid 140 is energized by a source, which is switched on by control means explained hereinafter, the solenoid shaft 142 rotates through a predetermined angle to permit cam 141 to disengage stylus mounting plate 125 for effecting its work position, as shown in FIG. 10. The lift position of the assembly is achieved when the solenoid energizing source is switched off and the cam is driven back to its normally biased non-actuated position in which the cam engages mounting plate 125 and lifts the stylus mounting assembly, whereby the stylus tip is removed from the microfilm surface.

In accordance with conventional pantograph principles the actual area over which the stylus travel is determined by the relative position of the fixed output pivot. Thus, by varying the location of the fixed output pivot, overlapping sectors of a certain area can be selected. To this end means are provided for physically adjusting pivot 90 to four detent positions. A pivot mount 143 is fixed to a shaft 144 and moves in an axial direction therewith in response to an axial force applied (by conventional mechanism) to actuator arm 145, for overcoming the detenting force. Shaft 144 is slideably supported in a bushing 146 (mounted in a bracket 147) and a detent block 148. Detent means include a steel ball 149 urged by a spring 150 against shaft notches 151 to retain shaft 144 in one of four positions determined by axial displacement controlled by actuator 145.

The overlapping sectors mentioned above are best illustrated by FIG. 10A in which a section of film is shown over which four sectors I, II, III and IV are shown. Sectors I and III are shaded to clearly show the overlapping relationship. More specifically, when the frame of film shown in FIG. 10A is disposed in the marking-viewing station and shaft 144 is retained in the position shown in FIG. 10, then the corresponding position of the fixed output pivot 90 determines the general area within which the stylus excursions are limited, and the particular area for the position shown is illustrated in FIG. 10A as sector I. If, for example, shaft 144 is moved to the right to its next detented position, then pivot mount 143 (and accordingly pivot 90) is displaced the requisite distance to provide for limited stylus excursion as delineated by sector II shown in FIG. 10A. Likewise, sectors III (shaded) and IV correspond to the third and fourth detented positions respectively.

FIG. 11 further illustrates the pen lift feature by showing an end view of the cam in its work and lift positions, the latter of which is a phantom outline. This view shows a variation of the stylus mounting assembly in which the mounting plate 153 is based against cam 141 by spring steel arm 154, and an alternative stylus is shown comprising a short cylindrical shank embedded in a transparent mounting plate 155.

The preferred embodiment of the input pen mounting assembly is shown in FIG. 12, wherein pen 46 is attached to a spherical swivel 156 mounted on input arm 51 at a position above the arm precisely corresponding to input point 73 as described hereinabove with respect to the linkage stylus (see FIG. 4 for example). Spherical swivel 156 is retained in housing 157 by a flat perssure spring 158 attached thereto. A pen mounted in this manner lends itself to comfortable manipulation by either a right-handed or left-handed operator in a regular writing motion. A mounting plate 153 is biased against cam 141 by spring microswitch 160 is also enclosed in housing 157 for controlling the drive power for pen lift solenoid 140. Input arm 51 is in normally disposed adjacent work surface 47; however, it may be flexed to close the switch when an operator applies a slight downward force to pen 46 to cause switch actuator shoe 161 to contact work surface 47 and axially displace actuator arm 162 to effect switch contact closure.

FIG. 13 is a cross sectional view of a further embodiment of the input pen and switch assembly. The pen comprises a main body portion 163 and a spherical tip 164 adapted for swivel mounting at input point 73. In this embodiment an axial plunger 165 is biased in down position by spring contact member 166. Upon application of force by normal pen manipulation the plunger urges spring contact member 166 into contact with terminal 167 to provide the switching through leads 168 for the stylus lift assembly discussed hereinabove.

Many safety features to protect the delicate stylus tip are possible by merely relating physical motion with electrical contacts for breaking the energizing circuit for the stylus lift assembly. For example, as shown in FIGS. 14 and 15, the excursion of the stylus tip can be mechanically and electrically limited by providing the pivot pin at the input point of the output pantograph with an extending electrically conducting tip 170 adapted to engage an electrical conducting plate 171 positioned in a rectangular recessed frame member 172. When the energizing circuit is connected through leads 173 and 174, the configuration of the conducting plate 171 determines the area over which the stylus tip at the output takeoff point may move because a short circuit from lead 173, through electrically conductive pivot 175 and conducting tip 170 to plate 171 and then to lead 174 only exists when tip 170 engages plate 171. The shape of the plate is determined by the relative shape of the microfilm frames in the marking-reading station. Further, the extending flanges 176 of frame member 172 provide a physical stop for conducting tip 170 as illustrated by the phantom outlined position 177 of the tip.

In FIG. 16, a simplified pantographic system is shown in relation to an optical projecting system, to illustrate a modified arrangement in which the novel marking apparatus may be adapted. Manipulation of input pen 180 at input point 181 causes corresponding miniaturized motion of stylus 182 disposed at the reading-marking station 183 in the same general manner as described above. However, the optical projection system is arranged in a well known manner to project an image on display screen 184 which is positioned at the work surface adjacent the input pen. This modification permits an operator to move the pen over the image in a direct relation to the actual displayed data.

FIG. 17 illustrates a further embodiment of the pantographic linkage system which may be employed in subject apparatus, wherein marking may be performed in a plane not parallel with the plane over which the input pen is manipulated. The two stage system operates according to standard series-connected pantograph principles; however, by virtue of the intermediate linkage employed the motion of the first pantograph can be transferred to the second pantograph without requiring that both pantographs be mounted in the same or parallel planes. Thus, motion of input pen 185 will result in motion of stylus 186 as described above but the marking can be performed on microfilm disposed in any non-parallel manner with respect to work surface 187. More specifically, the pantographic system comprises input pantograph 188 and output pantograph 189 having fixed pivots 190 and 191, respectively. The pivotally engaging pantographic members at the input and output fixed pivots include pairs of integral sector portions 192 and 193, and 194 and 195, respectively. The sectors 192 and 194 are connected by cable 196 and the sectors 193 and 195 are connected by cable 197, which cables are maintained under tension by springs 198 and 199, for biasing the sectors in a clockwise direction. Corresponding angular displacement of pivotally engaging members 201 and 202 is transferred to pivotally engaging members 203 and 204 and when desired the cables can be guided over appropriate capstans, two of which are illustrated by 206 and 207, to shift the plane of the input pantograph with respect to the output pantograph without effecting the motion transferred function of the cables.

In operation, an operator manipulates pen 46 (see FIG. 3) over work surface 47 in a pattern corresponding in configuration to marks that are simultaneously made on the microfilmed document image projected on screen 35. An image of the stylus tip is superimposed on the document image thereby providing a visual guide by which the operator may accurately coordinate the relationship of the input pen with respect to actual placement of marks on the viewed document copy. Assume, for example, that the image of a motor vehicle operator's permit is displayed on the screen and the operator wishes to change a portion of the information contained on the permit, e.g., it becomes necessary to change the permittee's name from "Miss Jane James" to "Mrs. John J. Jones." By viewing the image of the stylus tip the operator is able to accurately position the stylus tip immediately to the left of the word "Miss" on the display screen by moving pen 46 over the work surface without applying any downward force. After establishing the start position of the stylus tip, the operator then exerts a slight downward force on the pen to flex input arm 51, permitting axial displacement of actuator 66 for switch 65, which has contacts for controlling the stylus lift assembly. Thus, by applying such downward force simultaneously while moving the pen in the desired marking pattern the operator retains the stylus lift assembly in its work position, i.e., the stylus tip rests on the surface of the microfilm frame in the marking-viewing station. Returning now to the discussion of the specific example, when the stylus lift assembly is in its work position the stylus tip appears clearly defined to the left of the word "Miss" and as the pen is moved horizontally across surface 47 the stylus tip moves across the screen leaving a following mark in its path, which mark for the purpose of the example will be a cross-out line through "Miss Jane James." The operator may then, by following the same general procedure set forth above, add the desired updating interlineation, to wit "Mrs. John J. Jones."

The markings referred to in the above operational example will necessarily be a light mark on a dark background to permit the addition of intelligible data, because the novel use of Kalvar-type film, as discussed above with reference to a projection system, involves the unique, utilizations of properties whereby the film is made transparent in the area over which the stylus is moved. Thus, in effect, when the operator applies the cross-out line to the image, he is collapsing a series of expanded vesicules on the filmed image to permit additional light rays to pass through the film in a manner whereby the shadow cast on the screen is changed to the extent that it includes the horizontal cross-out line, or any other desired written data.

The linkage system between the input pen and the stylus includes a two-stage series-connected pantographic system in which the stylus tip is mounted at the output take-off point of the second stage and thereby moves in a direct geometric relationship with respect to the input pen and in a direction selectively rotated according to the actual film orientation, i.e., in the preferred embodiment a novel linkage arrangement is employed for 90° rotation to accommodate film conveyed in the orientation shown in FIG. 3.

In the event no marking is desired, the marking apparatus remains inoperative with the stylus mounting assembly resting on the lift cam such that the stylus tip remains posed above the film but not in contact therewith; and thus the ordinary microfilm reading function of the apparatus is not impeded. As discussed in the above example, if the operator wishes to make a mark on the microfilm, he grasps the pen in an ordinary writing position with his arm resting on the work surface, and in so doing deflects the input arm towards the work surface and causes the switch contact actuator to close the switch that controls the rotary cam stylus lift mechanism. The stylus remains in the work position until the input pen is released and the input arm returns to its normal non-flexed position.

When Kalvar-type film is used the stylus tip in the work position applies pressure to the expanded coating (as shown in FIG. 2) and, without removal of coating material, makes a mark that appears on the display screen as a light image on a dark background as explained above. Thus, in addition to the many advantages specifically pointed out in the above description or obvious from the above description, the invention provides a scheme in which film is marked while being observed under magnification without producing a residue in the viewing area that appears under magnification on the screen. Another advantage of this type of marking includes the uniformity of the marking lines as opposed to those lines produced by an instrument that progressively wears down and thus presents a progressively widening image. Still another advantage is the elimination of the problems involved when a marking instrument applies a mark such as ink that requires drying time.

Although the invention has been illustrated and described in detail by way of example, and specific embodiments and features, it is to be expressly understood that the invention is not limited thereto; various changes may be made in the method steps, the design, and in the arrangement of parts without departing from the spirit and scope of the invention as defined by the appended claims as will now be understood by those skilled in the art.

What is claimed is:

1. In a microfilm reader having a screen for displaying images carried by microfilm, apparatus for selectively marking said microfilm comprising:
   (a) a marking-viewing station;
   (b) means for positioning a selected portion of the microfilm at said marking-viewing station;
   (c) an output member having a marking tip for marking the surface of microfilm;
   (d) means mounting said output member at said marking-viewing station to position said marking tip in proximity to the selected portion of the microfilm;
   (e) an input member adapted for manipulation by an operator;
   (f) linkage means comprising a plurality of serially connected pantographs interconnecting the output member with the input member to cause the tip of said output member to be moved at a reduced ratio with respect to corresponding operator manipulation of said input member;

(g) said linkage means further comprising means including a bell crank member for establishing a substantially orthogonal direction of motion of the tip of the output member with respect to the direction of motion of the input member;

(h) means for bringing said tip into engagement with said selected portion of the microfilm for miniaturized marking of said microfilm when the operator manipulates said input member; and (i) means for transmitting the image of said tip onto the microfilm reader screen in superimposed manner with the displayed image of said selected portion of the microfilm.

2. In a microfilm reader-marking apparatus having a reading-marking station and an external work surface:

(a) means for holding microfilmed material at said reading-marking station;

(b) an input member having a substantially cylindrical body portion and an integral tip extending therefrom;

(c) means for movably mounting said input member with said tip adjacent said work-surface and said body portion extending therefrom in a substantially upright position, said input member adapted for manipulation by an operator;

(d) means for limiting the path over which the input member tip travels to a predetermined sector of the work surface;

(e) an output member having a marking tip for marking the surface of microfilmed material;

(f) linkage means interconnecting the output member with the input member to cause the output member to be moved in accordance with the motion of the input member;

(g) means for movably mounting said output member at said reading-marking station to position said marking tip in proximity to the microfilmed material, said position being in accordance with the position of the input member within said predetermined sector;

(h) means causing relative movement between the microfilmed material and the marking tip to bring said microfilm material and said marking tip into physical contact one with the other to effect marking of the microfilm material in an area defined by the limits to which the input member is confined;

(i) a display screen; and (j) image projecting means for projecting the image of said microfilmed material and marking tip onto said display screen, whereby movement of the marking tip and marking of the microfilmed material are visually accessible.

3. In microfilm reader-marking apparatus as set forth in claim 2, wherein said linkage means comprises a pantographic system including first and second tandem connected pantographs, said input member being an integral part of the first pantograph and said output member being an integral part of the second pantograph, and said path limiting means comprises adjustable mounting means for said second pantograph whereby a predetermined number of sectors correspond to a like number of second pantograph positions.

4. In microfilm reader-marking apparatus as set forth in claim 3, wherein adjustable mounting means includes a pivot mount for supporting said second pantograph, an axially movable shaft secured to said mount, and detent means for maintaining said shaft in one of a plurality of positions whereby a predetermined axial force applied to said shaft permits positioning of said second pantograph in a like plurality of positions.

5. In a microfilm reader-marking apparatus adapted to accommodate pressure sensitive microfilm media and having a reading marking station:

(a) means for holding the pressure sensitive microfilmed material at said reading-marking station;

(b) a movably mounted input member;

(c) an output member having a marking tip for marking the surface of microfilmed material;

(d) linkage means interconnecting the output member with the input member to cause the output member to be moved in accordance with the motion of the input member;

(e) means mounting said output member at said reading-marking station to position said marking tip in proximity to the microfilmed material;

(f) means causing relative movement between the microfilmed material and the marking tip to bring said microfilmed material and said marking tip into physical contact one with the other;

(g) means for variably applying pressure through said marking tip to effect marking of the microfilmed material;

(h) a display screen; and (i) image projecting means for projecting the image of said microfilmed material and marking tip onto said display screen, whereby movement of the marking tip and marking of the microfilmed material are visually accessible.

6. In a microfilm reader-marking apparatus as set forth in claim 5 wherein said output member mounting means includes a mounting plate for accommodating said tip and means for pivotally connecting said mounting plate adjacent said material, and said pressure applying means including at least one threaded stud member extending outwardly from said plate and ballast means adjustably disposed thereon, whereby a varying pressure is applied through said marking tip in accordance with the position of said ballast means on said stud member.

7. In a marking device:

(a) a pantographic linkage system having six pivotally engaging members, the first member having a first portion engaging second and third members extending therefrom in a parallel manner and a second portion extending therefrom, said third member comprising a first bell crank having one arm equal in length to said second member, a fourth member comprising an equi-arm bell crank having a first arm parallel to said first portions of said first arm and engaging at its apex with the extremity of said second member and engaging at the extremity of said first arm with the apex of the first bell crank, the fifth member comprising an arm equal in length to the second arm of said first bell crank and engaging the extremity of the second arm of said equi-arm bell crank, and the sixth member comprising an arm equal to the distance between the extremities of the first and second arms of said equi-arm bell crank and engaging the opposite end of said fifth member and the extremity of the second arm of said first bell crank;

(b) stationary pivot mounting means engaging the apex of said equi-arm bell crank;

(c) an input member mounted on the second portion of said first member and in line with the points of engagement between said second and third members and said first member;

(d) an output arm pivotally engaging the pantographic linkage system at the point of engagement between said fifth and sixth members; and (e) marking means associated with said output arm for moving in response to motion of said input member and in a direction rotated a predetermined angular amount with respect to the motion of said input arm.

8. In a marking device:

(a) a marking station having a work surface;

(b) a pantographic system having an input arm, and an output arm disposed at said marking station and adapted to move in accordance with motion imparted to said input arm;

(c) support means for mounting said pantographic system adjacent said marking station;

(d) a marking member operatively associated with said output arm for marking said work surface; and (e) a limit pin extending from said pantographic system and adapted to move in a manner similar to said output arm, said pin disposed for registration with a recess in said support means, said recess configuration determined by the desired excursion of said marking member with respect to said work surface.

9. In a marking device as set forth in claim 8 and including means for preventing said marking member from marking said work surface, means for actuating said preventive means, an electrically conductive plate mounted in said recess, said limit pin including an electrically conductive tip normally resting in said recess and electrical switch means conductive through said tip and said plate to control said actuating means, whereby marking is permitted only under conditions where said tip is in contact with said plate.

10. In a microfilm reader-marking apparatus having a reading-marking station;
   (a) means for holding microfilmed material at said reading-marking station;
   (b) a movably mounted input member;
   (c) an exterior work station having a planar work surface disposed adjacent said input member;
   (d) switch means having contacts operatively associated with said input member and adapted for closure when said input member is moved into engagement with said work station;
   (e) an output member having a marking tip for marking the surface of microfilmed material;
   (f) linkage means interconnecting the output member with the input member to cause the output member to be moved in accordance with the motion of the input member;
   (g) means mounting said output member at said reading-marking station to position said marking tip in proximity to the microfilmed material;
   (h) means causing relative movement between the microfilmed material and the marking tip to bring said microfilmed material and said marking tip into physical contact one with the other to effect marking of the microfilmed material;
   (i) drive means energized through said contacts, and means driven by said drive means to prevent said physical contact between said marking tip and said microfilmed material under cnoditions where said switch contacts are open;
   (j) a display screen; and
   (k) image projecting means for projecting the image of said microfilmed material and marking tip onto said display screen, whereby movement of the marking tip and marking of microfilmed material are visually accessible.

11. In a marking and reader apparatus for marking and reading an image-carrying medium, the combination including:
   (a) an image-carrying medium comprising a light transparent material having a coating including microscopic vesicules thereon, said vesicules when in a collapsed condition on said image carrying medium wherever the collapsed vesicules exist to present an optical image, and said vesicules when in an expanded or uncollapsed condition having light dispersing characteristics obstructing passage of light rays through said medium and preventing formation of an optical image wherever said expanded or uncollapsed vesicules exist;
   (b) means for positioning the image carrying medium at a marking-reading station;
   (c) a marking instrument disposed at said marking-reading station and operable for applying pressure to said image carrying medium to effect collapsing of the microscopic vesicules to provide a desired optical image;
   (d) manually operable means operably connected to said marking instrument for operation by an operator;
   (e) a display screen visually accessible to an operator; and
   (f) image projection means arranged to project onto said display screen a visual representation of the marking instrument and the image carrying medium at the marking-reading station, whereby the manipulation of the marking instrument with respect to said medium is visible to an operator in coordinating the movement of the marking instrument with respect to said medium.

12. In a microfilm reader having a screen for displaying images carried by microfilm, the combination including:
   (a) one or more microfilm frames comprising a transparent base material having a vesicular expanded plastic coating thereon;
   (b) a marking-reading station;
   (c) means for selectively positioning the microfilm at said marking-reading station;
   (d) a marking instrument disposed at said marking-reading station and operable for applying pressure to a selected area of the surface of said coating to effect collapsing of the expanded vesicules to provide desired marking;
   (e) means operably connected to said marking instrument for moving said marking instrument in accordance with the area selected; and
   (f) image projecting means arranged to project onto the display screen a visual representation of the image carried by said microfilm and the desired marking.

References Cited
UNITED STATES PATENTS

| | | | |
|---|---|---|---|
| 184,493 | 11/1876 | Anderson | 88—25 |
| 2,689,505 | 9/1954 | Ossenbach | 90—13.1 |
| 2,859,659 | 11/1958 | Fenske | 88—24 |
| 2,961,334 | 11/1960 | Clancy | 117—36.7 |

FOREIGN PATENTS 563,845  10/1923  France.

NORTON ANSHER, *Primary Examiner.*

W. M. FRYE, *Assistant Examiner.*